US012363809B2

(12) United States Patent
Tao

(10) Patent No.: US 12,363,809 B2
(45) Date of Patent: Jul. 15, 2025

(54) CEILING FAN LIGHT CONTROL CIRCUIT AND CEILING FAN LIGHT

(71) Applicant: SHENZHEN FUNPOWER GENERAL TECHNOLOGY CO., LTD., Shenzhen (CN)

(72) Inventor: Biaowei Tao, Shenzhen (CN)

(73) Assignee: SHENZHEN FUNPOWER GENERAL TECHNOLOGY CO., LTD., Shenzhen (CN)

( * ) Notice: Subject to any disclaimer, the term of this patent is extended or adjusted under 35 U.S.C. 154(b) by 34 days.

(21) Appl. No.: 18/512,595

(22) Filed: Nov. 17, 2023

(65) Prior Publication Data

US 2025/0081308 A1 Mar. 6, 2025

(30) Foreign Application Priority Data

Aug. 31, 2023 (CN) ........................ 202322384339.3

(51) Int. Cl.
*H02P 1/00* (2006.01)
*F04D 27/00* (2006.01)
*H05B 45/382* (2020.01)
*H05B 47/19* (2020.01)

(52) U.S. Cl.
CPC .......... *H05B 45/382* (2020.01); *F04D 27/00* (2013.01); *H05B 47/19* (2020.01)

(58) Field of Classification Search
CPC .................................................. H05B 45/382
See application file for complete search history.

(56) References Cited

U.S. PATENT DOCUMENTS

| | | | | |
|---|---|---|---|---|
| 6,265,984 | B1 * | 7/2001 | Molinaroli | G09F 19/125 340/815.45 |
| 7,196,485 | B1 * | 3/2007 | Lee | F24F 7/007 318/400.38 |
| 11,523,488 | B1 * | 12/2022 | Recker | H05B 47/105 |
| 12,098,831 | B1 * | 9/2024 | Ben-Ezra | H05B 45/14 |
| 2011/0058296 | A1 * | 3/2011 | Orchowski | H05B 39/044 361/88 |
| 2013/0051026 | A1 * | 2/2013 | Yang | F21V 29/677 362/373 |
| 2021/0140594 | A1 * | 5/2021 | Liu | F21S 4/10 |
| 2022/0232682 | A1 * | 7/2022 | Luo | H05B 45/3725 |
| 2024/0038456 | A1 * | 2/2024 | Dimberg | H05B 47/19 |
| 2024/0414822 | A1 * | 12/2024 | Wang | H05B 45/20 |
| 2025/0040017 | A1 * | 1/2025 | Weng | F21S 4/28 |

* cited by examiner

*Primary Examiner* — Jared Fureman
*Assistant Examiner* — Esayas G Yeshaw
(74) *Attorney, Agent, or Firm* — Westbridge IP LLC

(57) ABSTRACT

Disclosed are a ceiling fan light control circuit and a ceiling fan light. The ceiling fan light control circuit includes an isolated power supply conversion circuit, a lighting control circuit and a motor control circuit. The input terminal of the isolated power supply conversion circuit is electrically connected to the power supply terminal, and the output terminal of the isolated power supply conversion circuit is connected to the power supply terminal of the lighting control circuit and the power supply terminal of the motor control circuit respectively. The power supply voltage outputted by the power supply terminal is converted by the isolated power supply conversion circuit and then is isolated and outputted to the power supply terminal of the lighting control circuit and the power supply terminal of the motor control circuit.

10 Claims, 4 Drawing Sheets

CEILING FAN LIGHT CONTROL CIRCUIT AND CEILING FAN LIGHT

CROSS-REFERENCE TO RELATED APPLICATIONS

This application claims priority to Chinese Patent Application No. 202322384339.3, filed on Aug. 31, 2023, the entire contents of which are incorporated herein by reference.

TECHNICAL FIELD

The present application relates to the technical field of electrical equipment, and in particular to a ceiling fan light control circuit and a ceiling fan light.

BACKGROUND

With the improvement of people's living standards, ceiling fan lights with dual functions of lighting and accelerating air flow are gradually coming into people's field of vision. The ceiling fan light mainly includes two parts, namely the lighting device and the fan. The ceiling fan light includes the lighting control circuit and the motor control circuit that control the lighting devices and fans separately.

During the process of conceiving and implementing the present application, the inventor found that there are at least the following problems: the control circuit of the existing ceiling fan light adopts the high voltage, which may lead to damage to the control circuit. In this case, not only safety hazards will be caused and product reliability will be reduced, but also the requirements on the insulation performance and safety protection of the entire ceiling fan light are high.

SUMMARY

The main purpose of the present application is to provide a ceiling fan light control circuit and a ceiling fan light, aiming to solve the problem that the high voltage in the existing control circuit will cause safety hazards and reduce product reliability.

In order to solve the above objectives, the present application provides a ceiling fan light control circuit including a lighting control circuit, a motor control circuit and an isolated power supply conversion circuit, an input terminal of the isolated power supply conversion circuit is electrically connected to a power supply terminal, and an output terminal of the isolated power supply conversion circuit is respectively connected to a power supply terminal of the lighting control circuit and a power supply terminal of the motor control circuit; and the isolated power supply conversion circuit is configured to convert a power supply voltage outputted by the power supply terminal, then the isolated power supply conversion circuit is configured to isolate and output the power supply voltage to the power supply terminal of the lighting control circuit and the power supply terminal of the motor control circuit.

In an embodiment, the power supply voltage is a first alternating voltage;

the isolated power supply conversion circuit includes a rectifying and filtering circuit and an isolated switching power supply circuit.

An input terminal of the rectifying and filtering circuit is electrically connected to the power supply terminal, and is configured to rectify and filter the first alternating voltage and output a first direct voltage; and an input terminal of the isolated switching power supply circuit is electrically connected to an output terminal of the rectifying and filtering circuit, and an output terminal of the isolated switching power supply circuit is respectively connected to the power supply terminal of the lighting control circuit and the power supply terminal of the motor control circuit; and the isolated switching power supply circuit is configured to convert the first direct voltage, then the isolated switching power supply circuit is configured to isolate and output the first direct voltage to the power supply terminal of the lighting control circuit and the power supply terminal of the motor control circuit.

In an embodiment, the ceiling fan light control circuit further includes a main control circuit, the main control circuit includes a signal receiving terminal for receiving an external control signal, and the main control circuit is electrically connected to a controlled terminal of the lighting control circuit and a controlled terminal of the motor control circuit respectively; and the main control circuit is configured to control the lighting control circuit and/or the motor control circuit to operate according to the external control signal.

In an embodiment, the ceiling fan light control circuit further includes a remote control signal receiving circuit, the remote control signal receiving circuit is electrically connected to the signal receiving terminal of the main control circuit, and is configured to receive the external control signal sent by an external remote controller and output the external control signal to the signal receiving terminal of the main control circuit.

In an embodiment, the remote control signal receiving circuit is a radio frequency (RF) receiving circuit, and the RF receiving circuit is electrically connected to the signal receiving terminal of the main control circuit for receiving the external control signal sent by the external remote controller and outputting the external control signal to the signal receiving terminal of the main control circuit.

In an embodiment, the ceiling fan light control circuit further includes a wireless communication circuit, the wireless communication circuit is electrically connected to the signal receiving terminal of the main control circuit and is communicatively connected to an external terminal for receiving the external control signal sent by the external terminal and outputting the external control signal to the signal receiving terminal of the main control circuit.

In an embodiment, the ceiling fan light control circuit further includes a voltage conversion circuit, an input terminal of the voltage conversion circuit is electrically connected to the output terminal of the isolated switching power supply circuit, and an output terminal of the voltage conversion circuit is electrically connected to the main control circuit; and the voltage conversion circuit is configured to convert and output a voltage outputted by the isolated switching power supply circuit to the main control circuit.

In addition, in order to solve the above objectives, the present application further provides a ceiling fan light including a lighting device, a motor and the ceiling fan light control circuit, the lighting control circuit of the ceiling fan light control circuit is electrically connected to the lighting device, and the motor control circuit of the ceiling fan light control circuit is electrically connected to the motor; and the lighting control circuit of the ceiling fan light control circuit is configured to output a first voltage to the lighting device, and the motor control circuit of the ceiling fan light control circuit is configured to output a second voltage to the motor.

In an embodiment, the ceiling fan light of further includes a fan, a suspension device and a connecting piece, the lighting device is provided at an end of the fan, the fan is provided with fan blades, and an end of the fan away from the lighting device is connected to the connecting piece, and an end of the connecting piece away from the lighting device is connected to the suspension device.

In an embodiment, a difference between a second voltage value and a first voltage value is greater than 25% of the first voltage value.

The present application provides a ceiling fan light control circuit and a ceiling fan light. The ceiling fan light control circuit includes an isolated power supply conversion circuit, a lighting control circuit and a motor control circuit. The input terminal of the isolated power supply conversion circuit is electrically connected to the power supply terminal, and the output terminal of the isolated power supply conversion circuit is connected to the power supply terminal of the lighting control circuit and the power supply terminal of the motor control circuit respectively. The power supply voltage outputted by the power supply terminal is converted by the isolated power supply conversion circuit and then is isolated and outputted to the power supply terminal of the lighting control circuit and the power supply terminal of the motor control circuit. In the present application, the power supply voltage outputted by the power supply terminal is converted through the isolated power supply conversion circuit and then is isolated and outputted to the power supply terminal of the lighting control circuit and the power supply terminal of the motor control circuit. Thus, the low voltage will be supplied to the lighting control circuit and the motor control circuit, which not only can reduce the risk of product damage and reduce the insulation level requirements, but also can improve product reliability and safety.

BRIEF DESCRIPTION OF THE DRAWINGS

To illustrate the technical solutions according to the embodiments of the present application or the related art more clearly, the accompanying drawings for describing the embodiments or the related art are introduced briefly in the following. Apparently, the accompanying drawings in the following description are only about some embodiments of the present application, and person of ordinary skill in the art can derive other drawings from the accompanying drawings without creative efforts.

Figure 1:
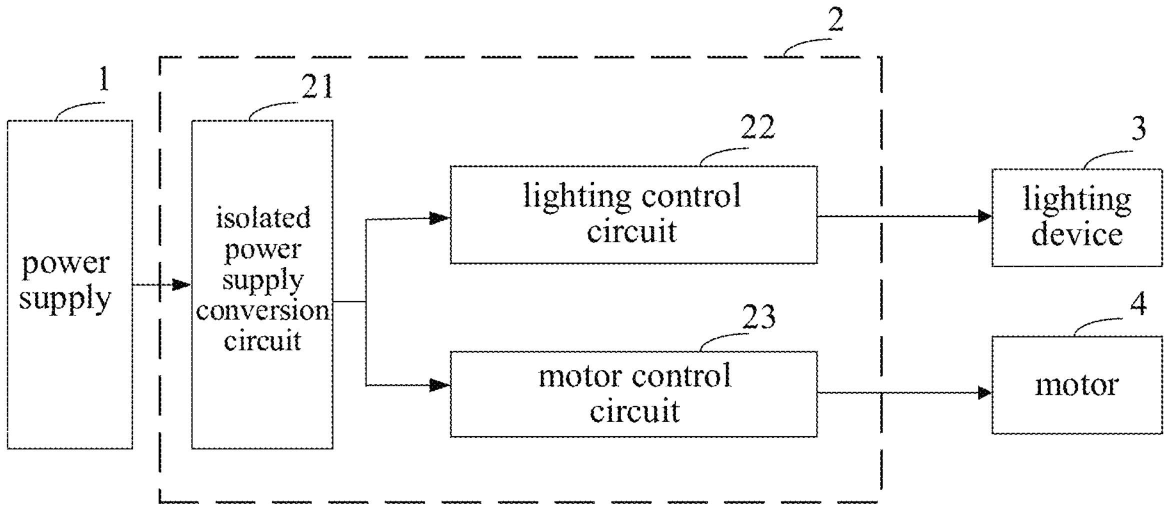
FIG. 1 is a schematic structural diagram of a ceiling fan light control circuit according to a first embodiment of the present application.

The realization of the objective, functional characteristics, and advantages of the present application are further described with reference to the accompanying drawings.

DETAILED DESCRIPTION OF THE EMBODIMENTS

The technical solutions of the embodiments of the present application will be described in detail below with reference to the accompanying drawings. It is obvious that the embodiments described are only some rather than all of the embodiments of the present application. All other embodiments obtained by those skilled in the art based on the embodiments of the present application without creative efforts shall fall within the claimed scope of the present application.

It should be noted that all the directional indications (such as up, down, left, right, front, rear . . . ) in the embodiments of the present application are only used to explain the relative positional relationship, movement, or the like of the components in a certain posture (as shown in the drawings). If the specific posture changes, the directional indication will change accordingly.

In the present application, unless otherwise clearly specified and limited, the terms “connected”, “fixed”, etc. should be interpreted broadly. For example, “fixed” can be a fixed connection, a detachable connection, or a whole; can be a mechanical connection or an electrical connection; may be directly connected, or indirectly connected through an intermediate medium, and may be the internal communication between two elements or the interaction relationship between two elements, unless specifically defined otherwise. For those of ordinary skill in the art, the specific meaning of the above-mentioned terms in the present application can be understood according to specific circumstances.

Besides, the descriptions associated with, e.g., “first” and “second,” in the present application are merely for descriptive purposes, and cannot be understood as indicating or suggesting relative importance or impliedly indicating the number of the indicated technical feature. Therefore, the feature associated with “first” or “second” can expressly or impliedly include at least one such feature. In addition, the technical solutions of the various embodiments can be combined with each other, but the combinations must be based on the realization of those skilled in the art. When the combination of technical solutions is contradictory or cannot be achieved, it should be considered that such a combination of technical solutions does not exist, nor does it fall within the scope of the present application.

With the improvement of people’s living standards, ceiling fan lights with dual functions of lighting and accelerating air flow are gradually coming into people’s field of vision. The ceiling fan light mainly includes two parts, namely the lighting device 3 and the fan 10. The ceiling fan light includes the lighting control circuit 22 and the motor control circuit 23 that control the lighting devices 3 and fans 10 separately.

During the process of conceiving and implementing the present application, the inventor found that there are at least the following problems: the control circuit of the existing ceiling fan light adopts the high voltage, which may lead to damage to the control circuit. In this case, not only safety hazards will be caused and product reliability will be reduced, but also the requirements on the insulation performance and safety protection of the entire ceiling fan light are high.

It should be understood that the control circuit in the existing ceiling fan light is the non-isolated control circuit with high voltage, that is, the voltage is inputted to the main control circuit 24 for rectification and then is directly supplied to the control circuit in the ceiling fan light. The high voltage causes a challenge to the reliability of the control circuit. In this case, the control circuit needs to take more efforts to improve the high voltage resistance performance to increase the reliability. Besides, in order to prevent high voltage from damaging the lighting device 3 and the motor of the fan, special protective devices need to be installed at the lighting device 3 and the motor of the fan.

To solve the problem that the product reliability will be reduced due to the high voltage, the present application provides a ceiling fan light control circuit 2. The ceiling fan light control circuit 2 includes a lighting control circuit 22 and a motor control circuit 23.

It can be understood that the lighting control circuit 22 and the motor control circuit 23 are respectively configured to control the illumination intensity of the lighting device 3 and the rotation of the motor 4. The lighting device 3 may be an alternating current (AC) lighting device, such as an incandescent lamp and a fluorescent lamp. The lighting device 3 may also be a direct current (DC) lighting device, such as a light-emitting diode (LED) lamp. The motor 4 can be a DC motor or an AC motor. Furthermore, the motor 4 can also be a brushless DC motor or a brushless AC motor. It should be noted that the types of control signals respectively outputted by the lighting control circuit 22 and the motor control circuit 23 to the lighting device 3 and the motor 4 are related to the types of the lighting device 3 and the motor 4. For example, the control signal outputted by the lighting control circuit 22 to the DC lighting device is the direct voltage or the direct current, and the control signal outputted by the motor control circuit 23 to the DC motor is the direct voltage or the direct current. The types of the lighting device 3 and the motor 4 are not limited, and there can also be an AC lighting device and a DC motor, or a DC lighting device and an AC motor.

As shown in FIG. 1, in an embodiment of the present application, the ceiling fan light control circuit 2 includes a lighting control circuit 22, a motor control circuit 23 and an isolated power supply conversion circuit 21. The input terminal of the isolated power supply conversion circuit 21 is electrically connected to the power supply terminal. The output terminal of the isolated power supply conversion circuit 21 is connected to the power supply terminal of the lighting control circuit 22 and the power supply terminal of the motor control circuit 23 respectively. The isolated power supply conversion circuit 21 is configured to convert a power supply voltage outputted by the power supply terminal, then the isolated power supply conversion circuit 21 is configured to isolate and output the power supply voltage to the power supply terminal of the lighting control circuit 22 and the power supply terminal of the motor control circuit 23.

In this embodiment, the power supply 1 connected to the power supply terminal may be a DC power supply. After the high-voltage DC outputted by the DC power supply is converted by the isolated power supply conversion circuit 21 into the low-voltage DC, the low-voltage DC is isolated and outputted to the lighting control circuit 22 and the motor control circuit 23. In a usage scenario more suitable for real life, the power supply 1 is the main control circuit 24. The isolated power supply conversion circuit 21 can convert the high-voltage AC into the low-voltage AC, and then the isolated power supply conversion circuit 21 can isolate and output the low-voltage AC to the lighting control circuit 22 and the motor control circuit 23. Besides, the isolated power supply conversion circuit 21 can also convert the high-voltage AC into the low-voltage DC, and then the isolated power supply conversion circuit 21 can isolate and output the low-voltage DC to the lighting control circuit 22 and the motor control circuit 23

It can be known from the above power supply 1, the lighting device 3 and the motor 4, the control circuit of the lighting device 3 needs to receive the low-voltage DC or low-voltage AC outputted by the isolated power supply conversion circuit 21, and then outputs the lighting control signal with the same type of the lighting device 3 to the lighting device 3. The motor control circuit 23 needs to receive the low-voltage DC or low-voltage AC outputted by the isolated power supply conversion circuit 21 and outputs a motor control signal with the same type of the motor 4 to the motor 4.

In order to protect the control circuit and improve the reliability of the control circuit and the reliability of the product, the isolated power supply conversion circuit 21 is configured to convert the power supply voltage outputted by the power supply terminal, and then isolates and outputs the voltage to the power supply terminal of the lighting control circuit 22 and the power supply terminal of the motor control circuit 23. The isolated power supply conversion circuit 21 physically isolates the power supply 1 from the control circuit, solving the problem that the high voltage exists in the control circuit. Even if the isolated power supply conversion circuit 21 fails, no high voltage will exist in the control circuit. Through the transformer W1, the isolated power supply conversion circuit 21 can convert the power supply voltage outputted by the power supply terminal, and then isolates and outputs the power supply voltage to the power supply terminal of the lighting control circuit 22 and the power supply terminal of the motor control circuit 23. The full voltage AC of 85V~265V, 50/60 HZ can be inputted to the isolated power supply conversion circuit 21, and the isolated power supply conversion circuit 21 is a high power (PF) device with a power factor greater than 0.9. The voltage outputted by the isolated power supply conversion circuit 21 can be adjusted and determined according to actual needs. The outputted voltage value of the isolated power supply conversion circuit 21 is not limited here. For example, the isolated power supply conversion circuit 21 can output any voltage value less than 36V, such as a direct voltage of 24V.

In an embodiment of the present application, the isolated power supply conversion circuit 21 converts the AC voltage outputted by the main control circuit 24 and then isolates and outputs a direct voltage of 24V to the lighting control circuit 22 and the motor control circuit 23 through the transformer W1. Since the isolated power supply conversion circuit 21 physically isolates the power supply 1 from the control circuit, the power supply 1 supplies power to the control circuit through the isolated power supply conversion circuit 21, and the isolated power supply conversion circuit 21 will output a low voltage, thereby solving the problem that the high voltage exists in the control circuit.

The present application provides a ceiling fan light control circuit 2. The ceiling fan light control circuit 2 includes an isolated power supply conversion circuit 21, a lighting control circuit 22 and a motor control circuit 23. The input terminal of the isolated power supply conversion circuit 21 is electrically connected to the power supply terminal, and the output terminal of the isolated power supply conversion circuit is connected to the power supply terminal of the lighting control circuit 22 and the power supply terminal of the motor control circuit 23 respectively. The power supply voltage outputted by the power supply terminal is converted by the isolated power supply conversion circuit 21 and then is isolated and outputted to the power supply terminal of the lighting control circuit 22 and the power supply terminal of the motor control circuit 23. In the present application, the power supply voltage outputted by the power supply terminal is converted through the isolated power supply conversion circuit 21 and then is isolated and outputted to the power supply terminal of the lighting control circuit 22 and the power supply terminal of the motor control circuit 23. Thus, the low voltage will be supplied to the lighting control circuit 22 and the motor control circuit 23, which not only can reduce the risk of product damage and reduce the insulation level requirements, but also can improve product reliability and safety.

Figure 2:
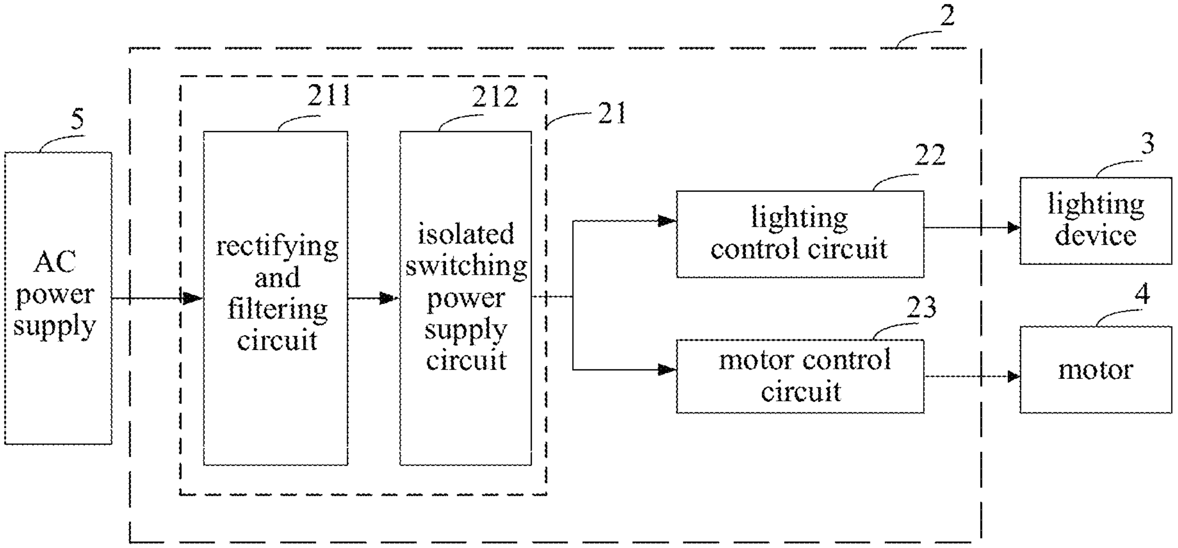
FIG. 2 is a schematic structural diagram of the ceiling fan light control circuit according to a second embodiment of the present application.

As shown in FIG. 2, in an embodiment of the present application, the power supply is an AC power supply 5, and the power supply voltage is a first alternating voltage. The isolated power supply conversion circuit 21 includes a rectifying and filtering circuit 211 and an isolated switching power supply circuit 212.

An input terminal of the rectifying and filtering circuit 211 is electrically connected to the power supply terminal, and is configured to rectify and filter the first alternating voltage and output a first direct voltage.

An input terminal of the isolated switching power supply circuit 212 is electrically connected to an output terminal of the rectifying and filtering circuit 211, and an output terminal VPP of the isolated switching power supply circuit 212 is respectively connected to the power supply terminal of the lighting control circuit 22 and the power supply terminal of the motor control circuit 23.

The isolated switching power supply circuit 212 is configured to convert a first direct voltage, then the isolated switching power supply circuit 212 is configured to isolate and output the first direct voltage to the power supply terminal of the lighting control circuit 22 and the power supply terminal of the motor control circuit 23.

It can be understood that in this embodiment, the motor 4 and the lighting device 3 are DC devices. After the rectifying and filtering circuit 211 rectifies and filters the first alternating voltage, the rectifying and filtering circuit 211 will output the first direct voltage. The rectifying and filtering circuit 211 may be a half-wave rectifying circuit, or a full-wave rectifying circuit, or a bridge rectifying circuit. The first direct voltage is high voltage. The isolated switching power supply circuit 212 can convert the first direct voltage, which means that the isolated switching power supply circuit 212 may step up or down the voltage. In order to solve the problem that the high voltage exists in the control circuit, the isolated switching power supply circuit 212 converts the first direct voltage to the low voltage and then isolates and outputs the low voltage to the power supply terminal of the lighting control circuit 22 and the power supply terminal of the motor control circuit 23. The isolated switching power supply circuit 212 is used to perform DC-DC conversion, and the first direct voltage is stepped down and then isolated and outputted. The isolated switching power supply circuit 212 may be a half-bridge circuit, a full-bridge circuit or a push-pull circuit. There is an isolation device inside the isolated switching power supply circuit 212 to physically isolate the control circuit and the rectifying and filtering circuit 211. The transformer W1 can be used as an isolation device.

The rectifying and filtering circuit 211 rectifies and filters the high-voltage AC and outputs the high-voltage DC. The isolated switching power supply physically isolates the lighting control circuit 22 and the motor control circuit 23 from the rectifying and filtering circuit 211. In addition, after the isolated switching power supply circuit 212 steps down the high-voltage DC, the isolated switching power supply circuit 212 will isolate and output the low-voltage DC to the power supply terminal of the lighting control circuit 22 and the power supply terminal of the motor control circuit 23. In this embodiment, the high-voltage AC is converted into the low-voltage DC through the rectifying and filtering circuit 211 and the isolated switching power supply circuit 212, and the low-voltage DC is outputted to the lighting control circuit 22 and the motor control circuit 23, which can provide a safe voltage for the motor control circuit 23 and the control circuit of the lighting device 3. In this way, not only the problem that the high voltage exists in the control circuit can be solved, but also the motor control circuit 23 and the control circuit of the lighting device 3 can control the DC motor and the DC lighting device 3 respectively and conveniently. The safe voltage can be any direct voltage less than 36V.

Figure 3:
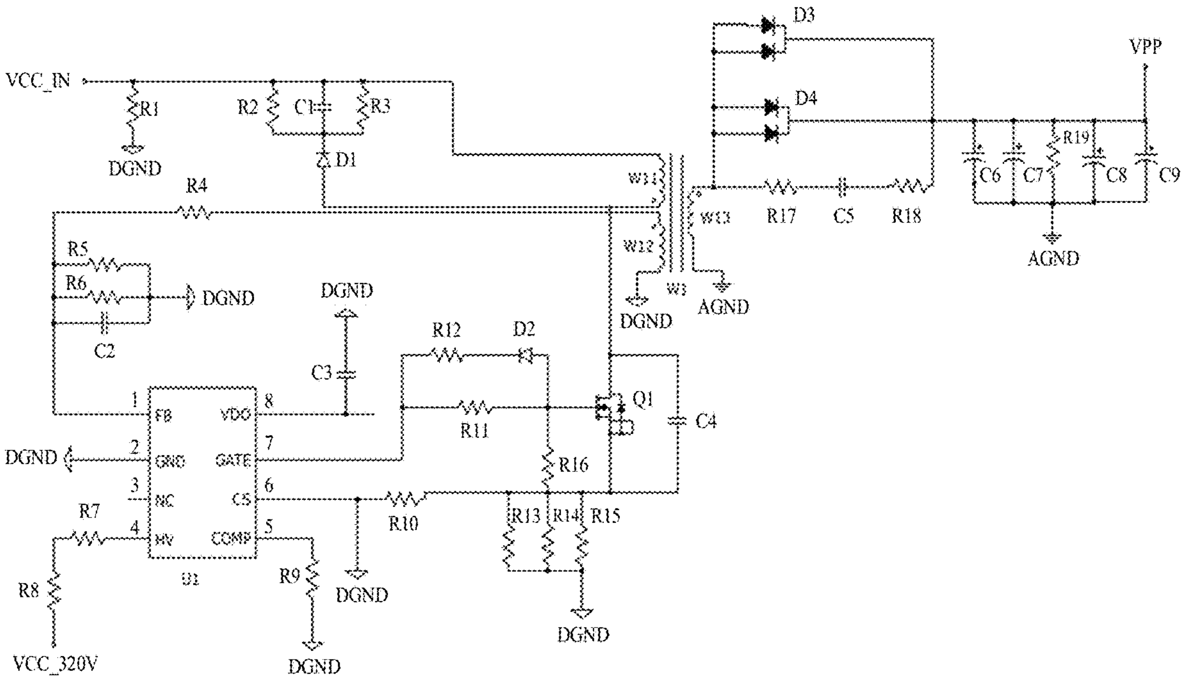
FIG. 3 is a structural diagram of an isolated switching power supply circuit in FIG. 2.

As shown in FIG. 3, in an embodiment of the present application, the isolated switching power supply circuit 212 includes an input unit, a detection unit, a control unit and an output unit.

VCC_IN and VCC_320*v* represent the first output terminal and the second output terminal of the rectifying and filtering circuit. VPP represents the output terminal of the isolated switching power supply circuit.

The connection relationship of the input unit is described below. One terminal of the first resistor R1 is connected to the first output terminal VCC_IN of the rectifying and filtering circuit, and the other terminal of the first resistor R1 is connected to the primary ground DGND. The second resistor R2, the third resistor R3 and the first capacitor C1 are connected in parallel. The first terminal of the second resistor R2 is connected to the first output terminal VCC_IN of the rectifying and filtering circuit and the first terminal of the first coil W11 of the transformer. The second terminal of the second resistor R2 is connected to the negative pole of the first diode D1, and the positive pole of the first diode D1 is connected to the second terminal of the first coil W11 of the transformer.

The first resistor R1 is configured to provide a current path for the DC outputted by the first output terminal VCC_IN of the rectifying and filtering circuit when the transformer W1 fails. The second resistor R2, the third resistor R3 and the first capacitor C1 are configured to filter the DC. The first diode D1 is configured to determine the current direction.

The connection relationship of the detection unit is described below. The first terminal of the second coil W12 of the transformer is connected to the first terminal of the fourth resistor R4, and the second terminal of the second coil W12 of the transformer is connected to the primary ground DGND. The fifth resistor R5, the sixth resistor R6 and the second capacitor C2 are connected in parallel. The first terminal of the fifth resistor R5 is connected to the second terminal of the fourth resistor R4 and the terminal FB of the chip U1, and the second terminal of the fifth resistor R5 is connected to the primary ground DGND.

The fourth resistor R4 is configured to obtain the detection voltage from the second coil W12 of the transformer. The fifth resistor R5, the sixth resistor R6 and the second capacitor C2 are configured to filter the detection voltage and output the detection voltage to the terminal FB of the chip U1.

The connection relationship of the control unit is described below. One terminal of the seventh resistor R7 is connected to the terminal HV of the chip U1, and the other terminal of the seventh resistor R7 is connected to one terminal of the eighth resistor R8. The other terminal of the eighth resistor R8 is connected to the second output terminal VCC_320*v* of the rectifying and filtering circuit. One terminal of the third capacitor C3 is connected to the terminal VDO of the chip U1, and the other terminal of the third capacitor C3 is connected to the primary ground DGND. One terminal of the ninth resistor R9 is connected to the terminal COMP of the chip U1, and the other terminal of the ninth resistor R9 is connected to the primary ground DGND. The first terminal of the twelfth resistor R12 is connected to the terminal GATE of the chip U1, and the second terminal of the twelfth resistor R12 is connected to the negative pole of the second diode D2. The positive pole of the second diode D2 is connected to the second terminal of the eleventh resistor R11, and the first terminal of the eleventh resistor R11 is connected to the first terminal of the twelfth resistor R12. The first terminal of the tenth resistor R10 is connected to the terminal CS of the chip U1, and the second terminal of the tenth resistor R10 is connected to the second terminal of the sixteenth resistor R16. The first terminal of the sixteenth resistor R16 is connected to the second terminal of the eleventh resistor R11. The thirteenth resistor R13, the fourteenth resistor R14 and the fifteenth resistor R15 are connected in parallel. The first terminal of the thirteenth resistor R13 is connected to the second terminal of the tenth resistor R10, and the second terminal of the thirteenth resistor R13 is connected to the primary ground DGND. The gate of the first MOS transistor Q1 is connected to the second terminal of the eleventh resistor R11, and the source of the first MOS transistor Q1 is connected to the first terminal of the thirteenth resistor R13. The drain of the first MOS transistor Q1 is connected to the first terminal of the second coil W12 of the transformer. The fourth capacitor C4 is provided in parallel on the drain and source of the first MOS transistor Q1.

The seventh resistor R7 and the eighth resistor R8 are current-limiting resistors, the third capacitor C3 is a filter capacitor, and the tenth resistor R10 is configured to sample the source of the first MOS tube Q1 and then output it to the terminal CS of chip U1. The thirteenth resistor R13, the fourteenth resistor R14, and the fifteenth resistor R15 are current-limiting resistors. The sixteenth resistor R16 is configured to pull down the voltage of the gate of the first MOS transistor Q1 when the first MOS transistor Q1 is not turned on.

The connection relationship of the output unit is described below. The first terminal of the third coil W13 of the transformer is connected to the positive pole of the third diode D3, the positive pole of the fourth diode D4, and the first terminal of the seventeenth resistor R17. The second terminal of the third coil W13 of the transformer is connected to the secondary ground AGND. One terminal of the third capacitor C3 is connected to the second terminal of the seventeenth resistor R17, and the other terminal of the third capacitor C3 is connected to the first terminal of the eighteenth resistor R18. The second terminal of the eighteenth resistor R18 is connected to the negative pole of the third diode D3 and the negative pole of the fourth diode D4. The sixth capacitor C6, the seventh capacitor C7, the eighth capacitor C8, the ninth capacitor C9 and the nineteenth resistor R19 are connected in parallel. The first terminal of the sixth capacitor C6 is the output terminal VPP of the isolated switching power supply circuit, and the second terminal of the sixth capacitor C6 is connected to the secondary ground AGND.

The sixth capacitor C6, the seventh capacitor C7, the eighth capacitor C8 and the ninth capacitor C9 are used for voltage stabilization, and the nineteenth resistor R19 is used for providing a current channel. The third diode D3 and the fourth diode D4 are configured to prevent current backflow and determine the current direction. The seventeenth resistor R17 and the eighteenth resistor R18 are current-limiting resistors, and the fifth capacitor C5 is a filter capacitor.

The second terminal of the first coil W11 of the transformer, the first terminal of the second coil W12 of the transformer, and the first terminal of the third coil W13 of the transformer are the same named terminals. The first coil W11 and the iron core of the transformer convert voltage signals into magnetic signals and output them to the second coil and the third coil. The second coil W12 of the transformer is configured to obtain a voltage detection signal from the output terminal of the first coil, and the third coil W13 of the transformer is configured to obtain an output voltage from the output terminal of the first coil. The chip U1 is configured to obtain a detection signal through the terminal FB and output a control signal through the terminal GATE according to the detection signal, to control the conduction of the first MOS transistor Q1.

In this embodiment, the isolated switching power supply circuit 212 outputs the voltage signal to the detection unit and the output unit through the input unit. The detection unit receives the output value of the input unit and outputs it to the control unit. The control unit will control the input voltage value of the input unit according to the value of the detection unit. The output unit is configured to receive the output value of the input unit and output it. After the high-voltage DC is stepped down, the low-voltage DC is isolated and outputted to the power supply terminal of the lighting control circuit 22 and the power supply terminal of the motor control circuit 23.

Figure 4:
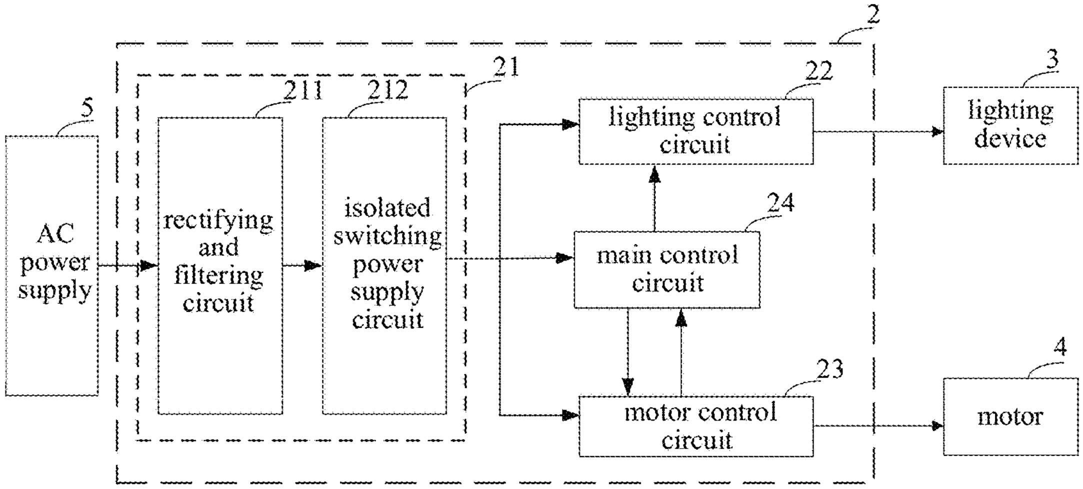
FIG. 4 is a first schematic structural diagram of the ceiling fan light control circuit according to a third embodiment of the present application.

As shown in FIG. 4, in an embodiment of the present application, the ceiling fan light control circuit 2 further includes a main control circuit 24.

The main control circuit 24 includes a signal receiving terminal for receiving an external control signal, and the main control circuit 24 is electrically connected to a controlled terminal of the lighting control circuit 22 and a controlled terminal of the motor control circuit respectively 23.

The main control circuit 24 is configured to control the lighting control circuit 22 and/or the motor control circuit 23 to operate according to the external control signal.

It can be understood that the main control circuit 24 can be an MCU, a digital signal process (DSP), a field programmable gate array (FPGA), a PLC, or a system on chip (SOC), and the like. The external control signal can be an analog signal, such as 4-20 mA or 1-5V. The external control signal can also be a digital signal, where the high level can be 3.3V and the low level can be 0V. In addition, according to the transmission method, the external control signal can also be a wireless control signal, such as a WiFi signal, a bluetooth signal or a radio frequency signal.

The external control signal is sent by the user and represents the instruction sent by the user to the ceiling fan light control circuit 2. The instruction may be used to adjust the light of the lighting device 3, including but not limited to the light intensity and the warmth. The instruction may also be used to adjust the operating state of the motor 4, including but not limited to the rotation speed and the power.

After receiving the external control signal, the main control circuit 24 processes the signal to obtain the user instruction. The processing may be demodulating the signal. The main control circuit 24 sends control signals to the lighting control circuit 22 and the motor control circuit 23 respectively according to the instruction, so that the lighting control circuit 22 controls the lighting state of the lighting device 3, and/or the motor control circuit 23 controls the operating state of the motor 4. The lighting control circuit 22 outputs a lighting control signal with the same type of the lighting device 3. For example, the lighting control circuit 22 outputs a DC lighting control signal to a DC lighting device. The lighting control signal may be a direct voltage or a direct current. The motor control circuit 23 outputs a motor control signal with the same type of the motor 4. For example, the motor control circuit 23 outputs a DC motor control signal to a DC motor. The motor control signal may be a direct voltage or a direct current.

It can be understood that in order to better control the operating state of the motor 4 and perform feedback control on the motor 4, the main control circuit 24 needs to send a control signal to the motor control circuit 23 and obtain the operating state of the motor 4 from the motor control circuit 23. The current operating state of the motor 4 is compared with the expected operating state of the motor 4 set by the user through the external control signal, then the control signal is adjusted. In addition, the control signal is outputted to the motor control circuit 23, so that the motor control circuit 23 can better control the operating state of the motor 4. In this embodiment, the main control circuit 24 controls the lighting control circuit 22 and/or the motor control circuit 23 to operate according to external control signals.

Figure 5:
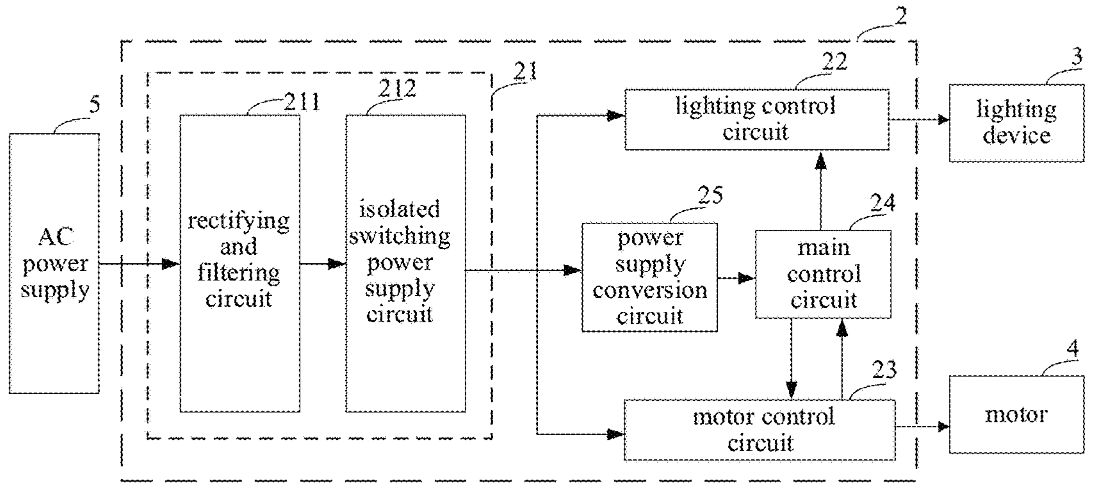
FIG. 5 is a second schematic structural diagram of the ceiling fan light control circuit according to the third embodiment of the present application.

As shown in FIG. 5, in an embodiment of the present application, considering that the working voltage of the main control circuit 24 is inconsistent with the working voltage of the lighting control circuit 22 and the motor control circuit 23, and the operation of the main control circuit 24 relies on a voltage that is stable within the working voltage range. Inappropriate working voltage will affect the normal operation of the main control circuit 24. As shown in FIG. 5, this embodiment uses a voltage conversion circuit. The input terminal of the voltage conversion circuit is electrically connected to the output terminal VPP of the isolated switching power supply circuit. The output terminal of the voltage conversion circuit is electrically connected to the main control circuit 24.

The voltage conversion circuit is configured to convert the voltage outputted by the isolated switching power supply circuit 212 and then output the voltage to the main control circuit 24.

It should be noted that, the power supply conversion circuit 25 can step up the voltage outputted by the isolated switching power supply circuit 212 and then output the voltage. The power supply conversion circuit 25 can be a DC boost circuit or a regulated DC boost circuit, such as the BOOST circuit. However, under normal circumstances, the operating voltages of the lighting control circuit 22 and the motor control circuit 23 are greater than the operating voltage of the main control circuit 24. The output voltage value of the isolated switching power supply circuit 212 can be any value less than 36V. The working voltage of the main control circuit 24 can be 3.3V or 5V. The working voltage of the main control circuit 24 is determined by the specific configuration of the main control circuit 24, which will not be limited here. The power supply conversion circuit 25 needs to step down the voltage outputted by the isolated switching power supply circuit 212 and then output the voltage, to meet the working voltage requirement of the main control circuit 24. For example, the output voltage value of the isolated switching power supply circuit 212 is 24V, and the power supply conversion circuit 25 converts the voltage of 24V and then outputs a voltage of 3.3V to the main control circuit 24. The power supply conversion circuit 25 may also be a BUCK circuit or an low dropout regulator (LDO) circuit. The output voltage of the LDO circuit is adjusted according to the operating voltage of the main control circuit 24. The LDO circuit outputs the working voltage to the main control circuit 24. For example, when the working voltage of the main control circuit 24 is 5V, the LDO circuit outputs a voltage of 5V to the main control circuit 24. When the working voltage of the main control circuit 24 is 3.3V, the LDO circuit outputs a voltage of 3.3V to the main control circuit 24. The LDO circuit has the advantages of small circuit board wiring area and relatively stability.

The power supply conversion circuit 25 converts the output voltage value of the isolated switching power supply circuit 212 and then outputs its working voltage to the main control circuit 24. In this way, different working voltage requirements of different circuit modules in the ceiling fan light can be satisfied, thereby improving the stability and reliability of the ceiling fan light.

In order to facilitate the user's control on the motor 4 and the lighting device 3, a receiving circuit that receives user instructions needs to be provided in the ceiling fan light control circuit 2.

Figure 6:
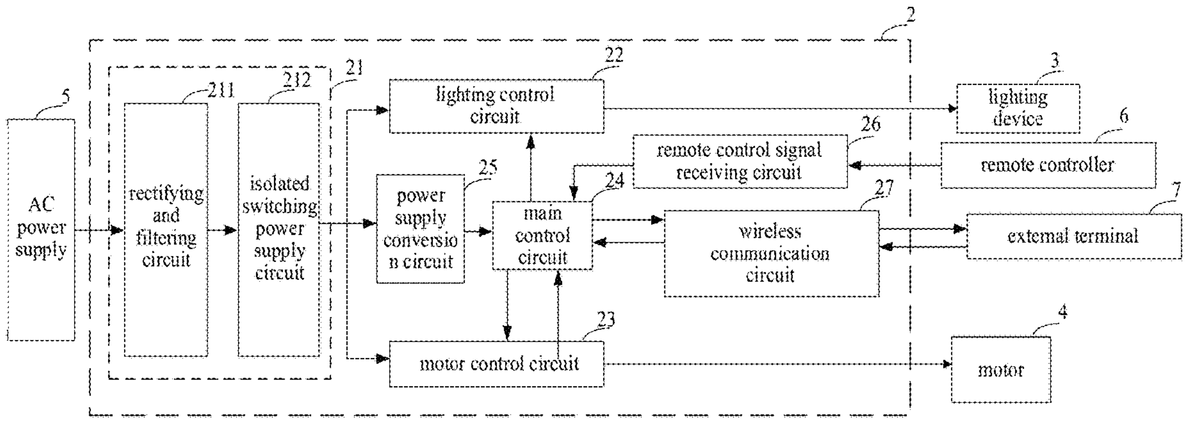
FIG. 6 is a third schematic structural diagram of the ceiling fan light control circuit according to the third embodiment of the present application.

As shown in FIG. 6, in an embodiment of the present application, the ceiling fan light control circuit 2 further includes a remote control signal receiving circuit 26.

The remote control signal receiving circuit 26 is electrically connected to the signal receiving terminal of the main control circuit 24, and is configured to receive the external control signal sent by an external remote controller and output the external control signal to the signal receiving terminal of the main control circuit 24.

The remote control signal receiving circuit 26 may be an infrared receiving circuit, and the external remote controller 6 corresponding to the remote control signal receiving circuit 26 includes an infrared transmitting circuit. The infrared receiving head in the infrared receiving circuit receives the infrared signal from the infrared transmitting tube in the external remote controller 6. The modulated carrier frequency of the infrared transmitting circuit generally ranges from 30 khz to 60 khz, and the frequency 38 kHz is most used. After receiving the infrared signal through the infrared receiving head, the infrared signal will be filtered, shaped, decoded, and amplified, then will be outputted to the signal receiving terminal of the main control circuit 24.

It should be noted that the external remote controller 6 can also emit radio waves and use radio waves to transmit signals. The longer the wavelength of the radio waves, the longer the transmission distance. Considering that the usage scenario of this present application is indoors, there is no special requirement for the transmission distance of radio waves. The fixed frequency within 300 MHz to 500 MHz can be selected to transmit the signal sent by the remote controller 6, such as 433.92 MHz, 315 MHz, 447.725 MHz or 303.875 MHz. The remote controller 6 and the remote control signal receiving circuit 26 may select any frequency from the above frequency range as the carrier frequency to transmit the external control signal.

Further, the remote control receiving circuit is a radio frequency signal (RF) receiving circuit, and the frequency of the RF can be 433.92 MHz, 315 MHz, 447.725 MHz or 303.875 MHz. The frequency of the RF is consistent with the frequency of the signal sent by the external remote controller 6 and can meet the usage requirements of the product. The RF receiving circuit may be a superheterodyne receiver circuit, a zero-IF receiver circuit or a low-IF receiver circuit. The RF receiving circuit is electrically connected to the signal receiving terminal of the main control circuit 24 for receiving the external control signal sent from an external remote controller and outputting the external control signal to the signal receiving terminal of the main control circuit 24.

In actual use, the user presses a button on the remote controller 6, and the remote controller 6 will generate a control signal according to the instruction of the user, then the remote controller 6 will transmit the control signal the remote control signal receiving circuit 26 via the radio wave. The remote control signal receiving circuit 26 receives the external control signal from the external remote controller and outputs the external control signal to the signal receiving terminal of the main control circuit 24.

The remote control signal receiving circuit 26 receives the control signal from the remote controller 6. In home use, the remote control 6 is often lost. In order to solve the problem that the user cannot send the external control signal to the ceiling fan light control circuit 2 when the remote control 6 is lost, the ceiling fan light control circuit 2 also includes a wireless communication circuit 27. The wireless communication circuit 27 is electrically connected to the signal receiving terminal of the main control circuit 24, and is communicatively connected to the external terminal 6 for receiving the external control signal sent from the external terminal 6 and outputting the external control signal to the signal receiving terminal of the main control circuit 24.

The wireless communication circuit 27 may be the WiFi communication circuit, the bluetooth communication circuit, the ZigBee communication circuit or the NFC-based communication circuit. Furthermore, the wireless communication circuit 27 may be the 2.4 Ghz WiFi communication circuit. The external terminal 6 may be the electronic device with a wireless communication module, such as the microcontroller with the WiFi module or the bluetooth module, the mobile phone, the desktop computer or the laptop with the bluetooth module or the WiFi module.

In actual use, through the APP software on the mobile phone, the user can select the instruction to be sent, and the mobile phone sends the instruction to the wireless communication circuit through the WiFi module. The wireless communication circuit receives the control signal sent by the mobile phone and outputs the control signal to the signal receiving terminal of the main control circuit 24. The main control circuit 24 will process the control signal and outputs the control signal to the motor control circuit 23 and the lighting control circuit 22, to control the motor 4 and the lighting device 3 to operate. In addition, the main control circuit 24 can use the control signal that is sent to the motor control circuit 23 and the lighting control circuit 22 and has been successfully executed as the current operating state of the lighting device 3 and the motor 4. Further, the main control circuit 24 can use the motor state signal outputted from the motor control circuit 23 to the main control circuit 24 as the operating state of the motor 4. The main control circuit 24 outputs the operating state of the lighting device 3 and the operating state of the motor 4 to the external terminal 6 through the wireless communication circuit 27, so that the user can check the operating state of the lighting device 3 and the motor 4 in the external terminal 6.

The present application also provides a ceiling fan light. The ceiling fan light includes a lighting device 3, a motor 4 and a ceiling fan light control circuit 2 as described in the above embodiments.

The lighting control circuit 22 of the ceiling fan light control circuit 2 is electrically connected to the lighting device 3, and the motor control circuit 23 of the ceiling fan light control circuit 2 is electrically connected to the motor 4.

The lighting control circuit 22 of the ceiling fan light control circuit 2 is configured to output a first voltage to the lighting device 3, and the motor control circuit 23 of the ceiling fan light control circuit 2 is configured to output a second voltage to the motor 4.

It can be understood that the lighting device 3 is provided in the ceiling fan light to realize the lighting function of the ceiling fan light. The lighting control circuit 22 is connected to the lighting device 3 to provide the lighting device 3 with the first voltage. Considering that the working state of the lighting device 3 is determined by its current inputted voltage value, so that the first voltage is the control signal of the lighting device 3. The lighting device 3 may be an incandescent lamp, a fluorescent lamp or an LED lamp. Further, the lighting device 3 may include the LED lamps in two circuits, one of which is the yellow LED and the other is the white LED. The control circuit of the lighting device 3 outputs PWM waves to the yellow LED and the white LED respectively, and adjusts the output power of the yellow LED and the white LED to achieve different color temperatures and different brightness. The PWM signals of multiple channels can be combined and adjusted, to make the LED light change flexibly and achieve different effects. In an embodiment, the brightness of the LED lamp can be adjusted in units of 2% between 0% and 100%. The color temperature of the LED lamp is the cool light only when white light is outputted, and the color temperature of the LED lamp is the warm light only when yellow light is outputted. When the white LED and the yellow LED emit light together, the higher the proportion of the yellow light, the warmer the color temperature of the LED. The operating voltage of the LED is 18V and the maximum power is 36 W.

It should be noted that the motor 4 can be a brush motor or a brushless motor, installed in the ceiling fan light. It is can be understood that the motor 4 is configured to drive the fan 10 to rotate, so that the air circulates flow. The motor control circuit 23 is connected to the motor 4 to provide a second voltage to the motor 4. Considering that the rotation speed and load capacity of the motor 4 depend on the input voltage, the second voltage provided by the motor control circuit 23 is the control signal of the motor 4. The motor 4 is a brushless DC motor with an operating voltage of 24V and a maximum power of 50 W.

Since the ceiling fan light adopts all the technical solutions of all the embodiments of the ceiling fan light control circuit 2 mentioned above, it has at least all the beneficial effects brought by the technical solutions of the above embodiments, which will not be repeated again here.

Figure 7:
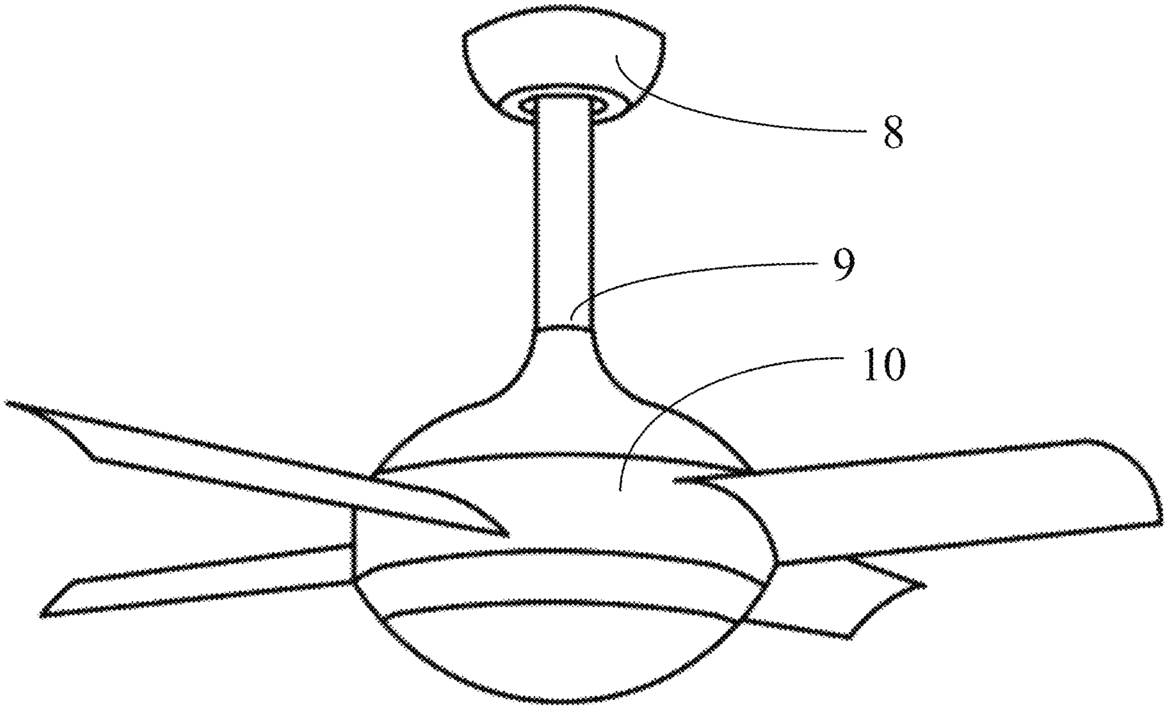
FIG. 7 is an appearance view of the ceiling fan light according to the present application.

As shown in FIG. 7, in an embodiment of the present application, the ceiling fan light includes a fan 10, a suspension device 8 and a connecting piece 9.

The lighting device 3 is provided at one end of the fan 10. The fan 10 is provided with fan blades. The end of the fan 10 away from the lighting device 3 is connected to the connecting piece 9. The end of the connecting piece 9 away from the lighting device 3 is connected to the suspension device 8.

It should be noted that, the fan 10 is mechanically connected to the motor 4, and the rotation of the motor 4 drives the rotation of the fan 10, so that the operation of the fan blades causes air flow. The fan blades may be made of metal or plastic. Considering that the installation and use scenario of the ceiling fan light is generally the ceiling, the LED is installed at the lower end of the fan 10 and is the component of the ceiling fan light farthest from the ceiling. The suspension device 8 is installed at the ceiling, and the connecting piece 9 connects the fan 10 and the suspension device 8, so that the ceiling fan light is installed at the ceiling. The suspension device 8 may be made of metal. The connecting piece 9 can be made of metal or plastic.

The input voltage of the motor control circuit 23 and the control circuit of the lighting device 3 is the output voltage of the isolated power supply conversion circuit 21, the motor control circuit 23 is connected to the motor 4, and the control circuit of the lighting device 3 is connected to the lighting device 3. Therefore, when the motor 4 starts, stops, switches gears, or fails, the operating state of the motor 4 changes, which will cause the output voltage of the motor control circuit 23 to fluctuate and then the output voltage of the isolated power supply conversion circuit 21 to fluctuate. Since the motor control circuit 23 and the control circuit of the lighting device 3 share the isolated power supply conversion circuit 21, the output voltage of the control circuit of the lighting device 3 will also fluctuate. The voltage outputted from the control circuit of the lighting device 3 to the lighting device 3 fluctuates, so that the lighting device 3 flickers when the operating state of the motor 4 changes.

In actual use, the power of the LED lamp and the power of the motor 4 can be freely combined and allocated. The maximum power of the LED lamp can reach 36 W, and the maximum power of the brushless DC motor can reach 50 W. The power of the switching power supply is 60 W, and the total power of the LED lamp and motor 4 is 60 W.

In order to solve the problem of the lighting device 3 flickering when the operating state of the motor 4 changes, especially when the motor 4 starts, the voltage difference between the second voltage value and the first voltage value is set to be greater than 25% of the first voltage value. The second voltage is the working voltage of the motor 4, which is determined by the specific model of the motor 4. The first voltage is the working voltage of the lighting device 3, which is determined by the specific model of the lighting device 3. The output power of the isolated power supply conversion circuit 21 is a certain value, and the lighting device power and the motor power jointly distribute the output power of the isolated power supply conversion circuit 21. The lighting device power and the motor power can be freely combined and distributed. When the operating state of the motor 4 changes, for example, when the motor 4 starts, the allocated power of the motor 4 becomes larger and the allocated power of the lighting device 3 becomes smaller. The output voltage value of the isolated power supply conversion circuit 21 becomes smaller, and the second voltage value decreases and fluctuates. When the second voltage value is lower than a certain percentage of the normal operating voltage of the lighting device 3, such as 75%, the user can observe the flashing of the lighting device 3 with the naked eyes. The specific voltage at which the lighting device 3 flashes depends on the specific components and model of the lighting device 3.

The second voltage value is greater than the first voltage value. Initially, the output voltage of the isolated power supply conversion circuit 21 is the second voltage value. When the motor 4 starts, the output voltage of the isolated power supply conversion circuit 21 becomes smaller. Since the output voltage of the isolated power supply conversion circuit 21 is greater than the first voltage value initially, when the output voltage becomes smaller, the reduced voltage value may be greater than the first voltage value. By setting an appropriate difference between the first voltage value and the second voltage value, the reduced output voltage value may not lead the lighting device 3 to flicker. The voltage difference between the second voltage value and the first voltage value is greater than 25% of the first voltage value, so that the lighting device 3 will not flicker when the operating state of the motor 4 changes.

In an embodiment of the present application, the first voltage is 18V, and the second voltage is 24V, which ensures that during the operation of the brushless motor, the LED has a stable voltage without frequent fluctuations, so that the lamp can output stably. It should be noted that, the output power of the isolated power supply conversion circuit 21 can be 60 W, and the isolated power supply conversion circuit 21 can output any voltage between 0V and DC36V, such as DC18V, DC24V or DC36V, and the like. The motor 4 and the lighting device 3 jointly distribute the output power of the isolated power supply conversion circuit 21. Further, the power outputted by the isolated power supply conversion circuit 21 is related to the power of the motor 4 and the lighting device 3. In addition, the working voltage of the motor 4 depends on the model of the motor 4, and the working voltage can be any voltage less than or equal to DC36V, for example, 24V. The working voltage of the lighting device 3 may be a voltage less than or equal to DC36V, for example, 18V. However, it should be noted that, when the motor 4 and the lighting device 3 work at the same time, in order to ensure that the change in the operating state of the motor 4 does not cause the lighting device 3 to flicker, the voltage difference between the operating voltage value of the motor 4 and the voltage value of the lighting device 3 may be greater than 25% of the voltage value of the lighting device 3.

The above-mentioned embodiments are only some embodiments of the present application, and are not intended to limit the scope of the present application. Any equivalent structure conversion made with reference to the description and the accompanying drawings of the present application, directly or indirectly applied in other related technical fields, should all fall in the scope of the present application.

What is claimed is:

1. A ceiling fan light control circuit, comprising a lighting control circuit, a motor control circuit and an isolated power supply conversion circuit, wherein:

an input terminal of the isolated power supply conversion circuit is electrically connected to a power supply terminal, and an output terminal of the isolated power supply conversion circuit is respectively connected to a power supply terminal of the lighting control circuit and a power supply terminal of the motor control circuit;

the isolated power supply conversion circuit is configured to convert a power supply voltage outputted by the power supply terminal, then the isolated power supply conversion circuit is configured to isolate and output the power supply voltage to the power supply terminal of the lighting control circuit and the power supply terminal of the motor control circuit;

a power factor of the isolated power supply conversion circuit is greater than 0.9; and an output power of the isolated power supply conversion circuit is 60 W, and the isolated power supply conversion circuit is configured to output a voltage in a range of 0V to 36V.

2. The ceiling fan light control circuit of claim 1, wherein:

the power supply voltage is a first alternating voltage;

the isolated power supply conversion circuit comprises:

a rectifying and filtering circuit, wherein an input terminal of the rectifying and filtering circuit is electrically connected to the power supply terminal, and is configured to rectify and filter the first alternating voltage and output a first direct voltage; and an isolated switching power supply circuit, wherein an input terminal of the isolated switching power supply circuit is electrically connected to an output terminal of the rectifying and filtering circuit, and an output terminal of the isolated switching power supply circuit is respectively connected to the power supply terminal of the lighting control circuit and the supply terminal of the motor control circuit; and the isolated switching power supply circuit is configured to convert the first direct voltage, then the isolated switching power supply circuit is configured to isolate and output the first direct voltage to the power supply terminal of the lighting control circuit and the power supply terminal of the motor control circuit.

3. The ceiling fan light control circuit of claim 2, further comprising a main control circuit, wherein:

the main control circuit comprises a signal receiving terminal for receiving an external control signal, and the main control circuit is electrically connected to a controlled terminal of the lighting control circuit and a controlled terminal of the motor control circuit respectively; and the main control circuit is configured to control the lighting control circuit and/or the motor control circuit to operate according to the external control signal.

4. The ceiling fan light control circuit of claim 3, further comprising a remote control signal receiving circuit, wherein:

the remote control signal receiving circuit is electrically connected to the signal receiving terminal of the main control circuit, and is configured to receive the external control signal sent by an external remote controller and output the external control signal to the signal receiving terminal of the main control circuit.

5. The ceiling fan light control circuit of claim 4, wherein:

the remote control signal receiving circuit is a radio frequency (RF) receiving circuit, and the RF receiving circuit is electrically connected to the signal receiving terminal of the main control circuit for receiving the external control signal sent by the external remote controller and outputting the external control signal to the signal receiving terminal of the main control circuit.

6. The ceiling fan light control circuit of claim 3, further comprising a wireless communication circuit, wherein:

the wireless communication circuit is electrically connected to the signal receiving terminal of the main control circuit and is communicatively connected to an external terminal for receiving the external control signal sent by the external terminal and outputting the external control signal to the signal receiving terminal of the main control circuit.

7. The ceiling fan light control circuit of claim 3, further comprising a voltage conversion circuit, wherein:

an input terminal of the voltage conversion circuit is electrically connected to the output terminal of the isolated switching power supply circuit, and an output terminal of the voltage conversion circuit is electrically connected to the main control circuit; and the voltage conversion circuit is configured to convert and output a voltage outputted by the isolated switching power supply circuit to the main control circuit.

8. A ceiling fan light, comprising a lighting device, a motor and the ceiling fan light control circuit of claim 1, wherein:

the lighting control circuit of the ceiling fan light control circuit is electrically connected to the lighting device, and the motor control circuit of the ceiling fan light control circuit is electrically connected to the motor; and the lighting control circuit of the ceiling fan light control circuit is configured to output a first voltage to the lighting device, and the motor control circuit of the ceiling fan light control circuit is configured to output a second voltage to the motor.

9. The ceiling fan light of claim 8, further comprising a fan, a suspension device and a connecting piece, wherein:

the lighting device is provided at an end of the fan, the fan is provided with fan blades, and an end of the fan away from the lighting device is connected to the connecting piece, and an end of the connecting piece away from the lighting device is connected to the suspension device.

10. The ceiling fan light of claim 8, wherein a difference between a second voltage value and a first voltage value is greater than 25% of the first voltage value.

* * * * *